United States Patent [19]

Yasukawa

[11] Patent Number: 5,614,982
[45] Date of Patent: Mar. 25, 1997

[54] AUTOMATIC FOCUS ADJUSTMENT DEVICE FOR ADJUSTING A FOCUS STATE OF A CAMERA LENS REGARDLESS OF SUBJECT STABILITY

[75] Inventor: Seiichi Yasukawa, Yotsukaido, Japan

[73] Assignee: Nikon Corporation, Tokyo, Japan

[21] Appl. No.: 522,576

[22] Filed: Sep. 1, 1995

[30] Foreign Application Priority Data

Oct. 31, 1994 [JP] Japan .................................. 6-267557

[51] Int. Cl.⁶ ............................................... G03B 13/36
[52] U.S. Cl. .................................. 396/95; 396/133
[58] Field of Search ............................... 354/400, 402, 354/403, 406, 407, 408

[56] References Cited

U.S. PATENT DOCUMENTS

| | | | |
|---|---|---|---|
| 4,878,077 | 10/1989 | Maeno et al. | |
| 4,897,683 | 1/1990 | Suzuki et al. | |
| 5,057,859 | 10/1991 | Ishimaru | 354/400 |
| 5,200,860 | 4/1993 | Hirasawa et al. | 354/400 |
| 5,210,562 | 5/1993 | Miyazawa et al. | 354/400 |

Primary Examiner—Russell E. Adams

[57] ABSTRACT

An automatic focus adjustment device for use with a camera having a photographic lens. The device includes, but is not limited to, a drive unit changing the amount of extension of a photographic lens, a lens position detection unit detecting the position of the photographic lens, a position deviation detection unit detecting the position deviation between a position of a subject as imaged by the photographic lens and an imaging plane, a speed deviation calculation unit inputting the position deviation detected by the position deviation detection unit and calculating the speed deviation due to a time change of the detected position deviation, a target drive speed calculation unit which, based on the position of the photographic lens as detected by the lens position detection unit and on the position deviation detected by the position deviation detection unit, calculates a target drive position for the photographic lens and calculates a target drive speed based on the time change of the target drive position, an ideal speed setting unit which, based on the position deviation detected by the position deviation detection unit, determines the ideal speed which has been previously set, a movement decision unit determining whether the subject is a moving body, a speed selection unit selecting the target drive speed when it has been determined by the movement decision unit that the subject is a moving body and selecting the ideal speed when it has been determined by the movement decision unit that the subject is a non-moving body and a calculation unit calculating the actuation amount to be output by the drive unit based on the position deviation detected by the position deviation detection unit, the speed deviation calculated by the speed deviation calculation unit and the speed selected by the speed selection unit.

13 Claims, 7 Drawing Sheets

AUTOMATIC FOCUS ADJUSTMENT DEVICE FOR ADJUSTING A FOCUS STATE OF A CAMERA LENS REGARDLESS OF SUBJECT STABILITY

BACKGROUND OF THE INVENTION

1. Field of the Invention

The present invention relates to an automatic focus adjustment device for use with a camera and that is capable of performing automatic focusing with respect to non-moving and moving subjects (i.e., regardless of subject stability).

2. Description of the Related Art

It is well known that automatic focus adjustment devices have been applied to cameras and other optical devices (e.g., video cameras, etc.) to perform automatic adjustment of the focus state of a photographic or imaging lens (e.g., a taking lens).

Typically, such autofocusing devices utilize a well known technique known as the phase difference method to detect focus displacement (hereinafter "defocus amount") of a subject image from the imaging plane. Based on such a defocus amount, a residual drive amount I that is necessary for focusing (i.e., to move a taking lens or the like) is calculated.

In such autofocusing devices, a calculation of an actuation amount E, which is provided to a drive mechanism of a photographic lens, is based on the following equation:

$$E = a \cdot i + \beta \cdot \int i \, dt + y \cdot di/dt \qquad (Eq. 1)$$

using, as the position deviation, the residual drive amount I calculated in the above manner. The coefficients a, $\beta$ and y, are set as feedback gains in a conventional manner.

Accordingly, with respect to a moving body subject, the proportional term (a·i) and the differential term (y·di/dt) are feed back values, and the photographic lens is driven so as to maintain a focused state relative to the speed of the subject image.

Moreover, with respect to a non-moving subject, by way of feedback of the proportional term (a·i), the photographic lens is driven in a direction which reduces the residual drive amount i, and becomes stationary in the focused state.

In the case of a moving subject, when maintaining the focused state following the movement of the subject, because the proportional term (a·i) and the differential term (y·di/dt) become zero, the actuation amount E fed back to the drive mechanism of the photographic lens decreases to a slight or ineffective degree.

When the actuation amount E is reduced to an extremely small degree in the aforementioned manner, due to friction and other energy losses of the drive mechanism, the speed of movement of the photographic lens is a reduced speed, and the movement of the photographic lens becomes minutely delayed with respect to the focus of the subject image.

As such, with respect to a moving subject, it becomes difficult to maintain a correctly focused state. Furthermore, with respect to a moving subject, because the photographic lens is intermittently driven, the smoothness of the focusing adjustment is impaired. Moreover, in the case that the subject is non-moving, when the residual drive amount i becomes rather small, because it is predominantly the differential term (y·di/dt) which is fed back to the equation Eq. 1, the force acting in the direction of standstill motion excessively slows the drive speed. As such, the response time required for focusing adjustment becomes quite long.

In the prior art, in order to remedy this problem, an integral term ($\beta \cdot \int i \, dt$) as shown in Eq. 1 was introduced, and by increasing the present actuation amount E using the past residual drive amount i, the time change of the actuation amount E was restrained, and the drive speed of the photographic lens was not abruptly decelerated.

By restraining the deceleration of the photographic lens in the aforementioned manner with respect to a moving body in the focused state following the speed of the subject, the past residual drive amount i was fed back to Eq. 1 by way of the integral term ($\beta \cdot \int i \, dt$), and the photographic lens was continuously driven in the direction of movement.

Accordingly, while maintaining the focused state, even if the present residual drive amount i becomes rather small, by feeding back the past residual drive amount i, because the photographic lens was continuously driven, the photographic lens was rapidly driven to the focused state, so that the response time for focusing adjustment was shortened.

As such, in prior art automatic focus adjustment devices utilizing the integral term ($\beta \cdot \int i \, dt$) and because the past residual drive amount i was fed back to the drive mechanism of the photographic lens, the control system included deadtime elements. The problem was that overshooting easily arose in the drive of the photographic lens, and the stability of the system was markedly impaired.

Because of the aforementioned problems, in order to maintain the stability of the camera system, the feedback gains a and y had to be limited, and a problem developed in that it was difficult to obtain good controllability.

Moreover, because a past time residual drive amount i was fed back for later processing, another problem developed in that focus adjustment could not conform to rapid changes of movement of the subject.

Furthermore, in the calculation of the integral term ($\beta \cdot \int i \, dt$), it was necessary to cumulatively store a past number of periods of the residual drive amount i, and as such, a problem developed in that large amounts of memory (i.e., random access memory) were occupied and required.

Additionally, in the calculation of the integral term ($\beta \cdot \int i \, dt$), it was necessary to successively add the residual drive amounts i of a number of past periods, and as such, a problem developed in that the load of the calculation process became heavy (i.e., computer processing was onerous due to such repeated addition).

SUMMARY OF THE INVENTION

Accordingly, it is an object of the present invention to solve the aforementioned problems associated with the prior art.

It is another object of the present invention to provide an autofocusing device that realizes greater autofocusing capabilities than prior art devices.

It is another object of the present invention to provide an autofocusing device that allows for accurate and fast autofocusing regardless of subject stability.

It is yet another object of the present invention to provide an autofocusing device that allows an imaging lens to quickly and accurately focus upon a moving object without causing stability problems for a camera or imaging device in which the autofocusing device is used.

It is still another object of the present invention to provide an autofocusing device that does not continuously move a camera's taking lens regardless of whether the subject to be photographed is moving.

It is still yet another object of the present invention to provide an automatic autofocusing device wherein time consuming calculation processes and the use of resources such as memory are minimized regardless of whether a subject to be photographed is moving.

It is yet a further object of the present invention to provide an automatic focus adjustment device which treats focusing conditions realized over successive imaging sessions in a common and uniform way regardless of subject stability so as to greatly reduce the load on memory capacity and on calculation processing.

Objects of the present invention are achieved by providing an automatic focus adjustment device for use with a camera having a photographic lens. The device includes, but is not limited to, a drive unit changing the amount of extension of a photographic lens, a lens position detection unit detecting the position of the photographic lens, a position deviation detection unit detecting the position deviation between a position of a subject as imaged by the photographic lens and an imaging plane, a speed deviation calculation unit inputting the position deviation detected by the position deviation detection unit and calculating the speed deviation due to a time change of the detected position deviation, a target drive speed calculation unit which, based on the position of the photographic lens as detected by the lens position detection unit and on the position deviation detected by the position deviation detection unit, calculates a target drive position for the photographic lens and calculates a target drive speed based on the time change of the target drive position, an ideal speed setting unit which, based on the position deviation detected by the position deviation detection unit, determines the ideal speed which has been previously set, a movement decision unit determining whether the subject is a moving body, a speed selection unit selecting the target drive speed when it has been determined by the movement decision unit that the subject is a moving body and selecting the ideal speed when it has been determined by the movement decision unit that the subject is a non-moving body, and a calculation unit calculating the actuation amount to be output by the drive unit based on the position deviation detected by the position deviation detection unit, the speed deviation calculated by the speed deviation calculation unit and the speed selected by the speed selection unit.

BRIEF DESCRIPTION OF THE DRAWINGS

The aforementioned and other objects and advantages of the present invention will become apparent and more readily appreciated from the following description of the preferred embodiment, taken in conjunction with the accompanying drawings, of which.

DETAILED DESCRIPTION OF THE PREFERRED EMBODIMENT

Figure 1:
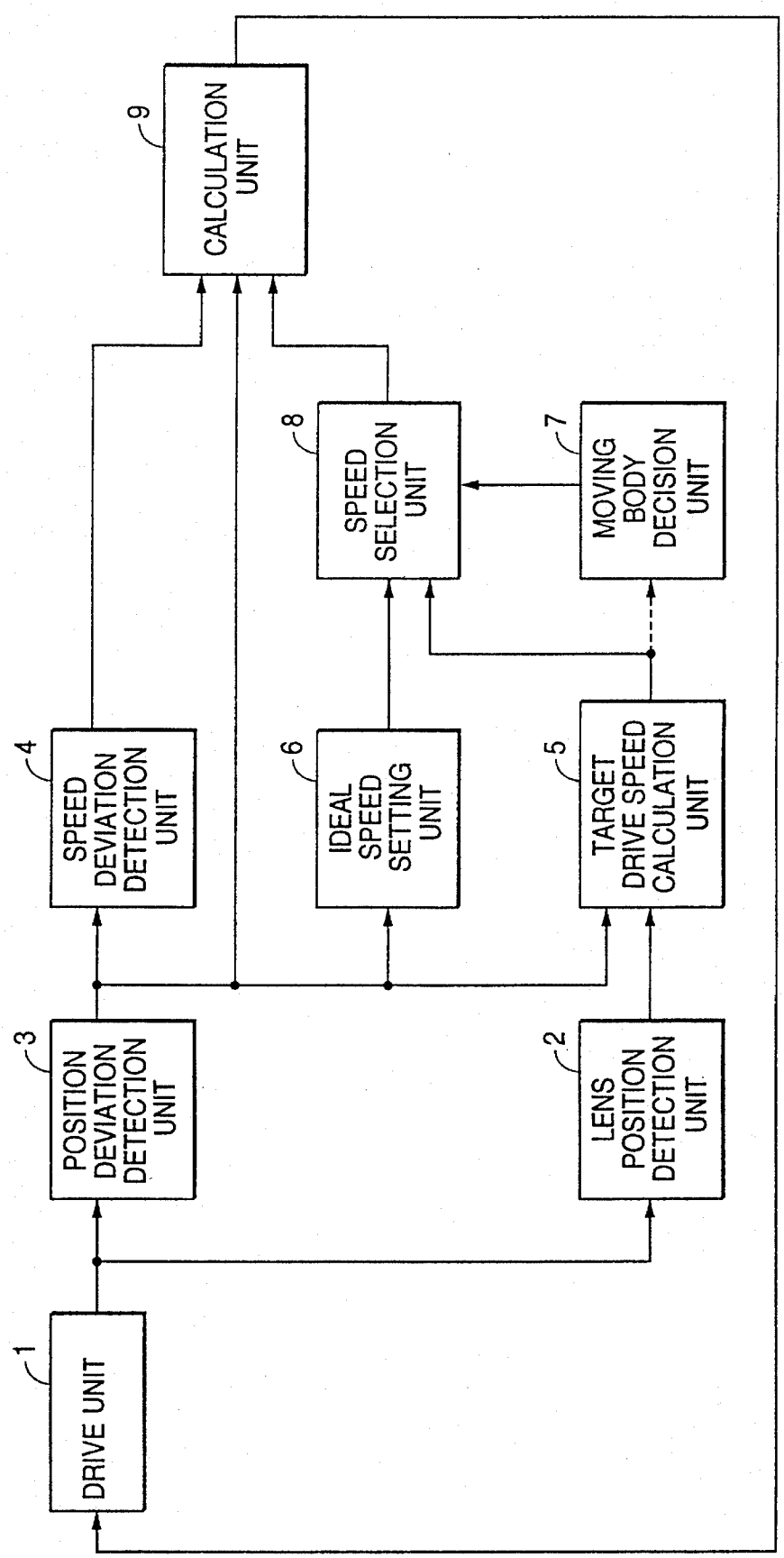
FIG. 1 is a block diagram of a preferred embodiment of the automatic focus adjustment device of the present invention.

Reference will now be made in detail to the present preferred embodiment of the present invention, examples of which are illustrated in the accompanying drawings, wherein like reference numerals refer to like elements throughout.

Referring now to FIG. 1, a block diagram shows a preferred embodiment of an automatic focus adjustment device of the present invention. In particular, FIG. 1 shows the interconnections between elements of the presently preferred embodiment including a drive unit 1 (e.g., a device to cause a change in the extension state of a lens), a lens position detection unit 2 (e.g., detects lens extension state), a position deviation detection unit 3, a speed deviation detection unit 4, a target drive speed detection calculation unit 5, an ideal speed setting unit 6, a moving body decision unit 7, a speed selection unit 8 and a calculation unit 9. The elements of the device shown in FIG. 1 and the operations of the same are discussed in greater detail below.

Figure 2:
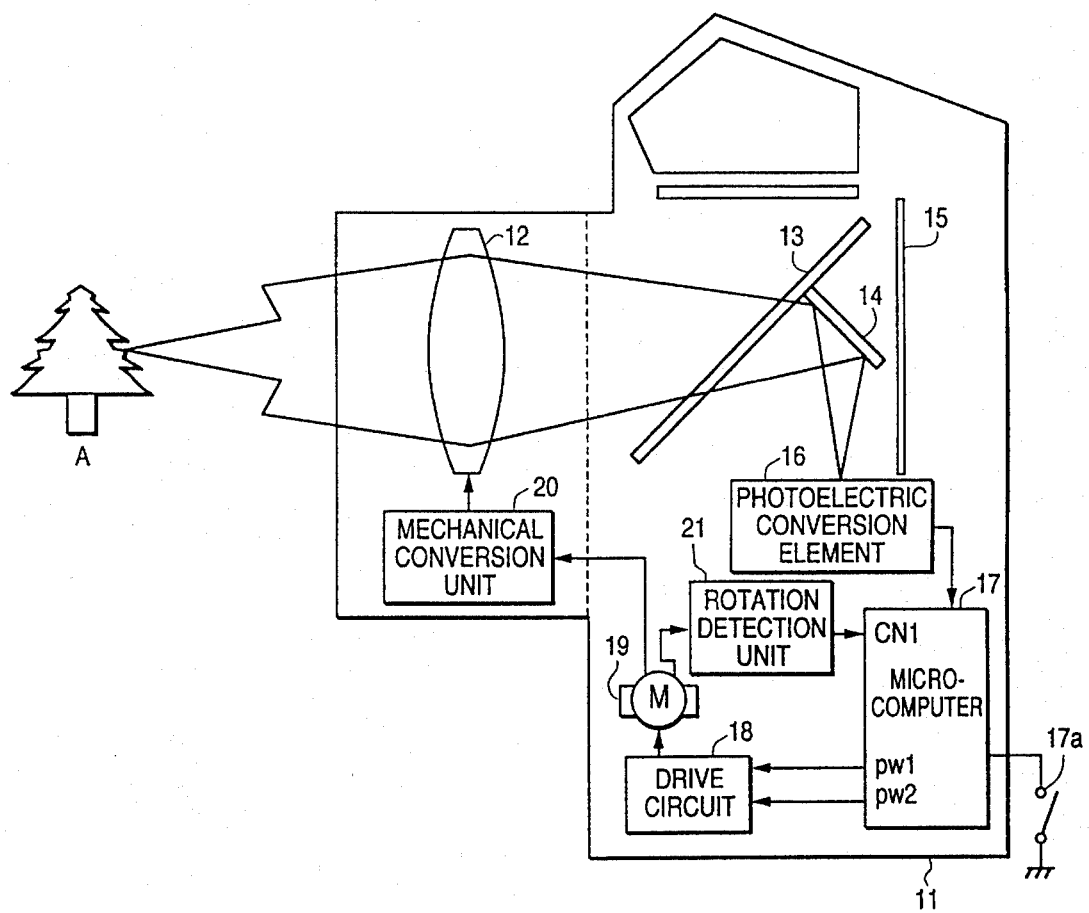
FIG. 2 is a diagram of a camera in which the preferred embodiment of FIG. 1 has been incorporated.

Referring now to FIG. 2, the presently preferred embodiment of the automatic focus adjustment device shown in FIG. 1 has been incorporated into a photographic camera. While a photographic camera is used herein for purposes of explanation and illustration, the present invention is not to be so limited. In fact, the present invention is applicable to other imaging devices including electronic still cameras, video devices, etc. Additionally, the present invention can be generally applied to an optical pickup unit of an optical disk device, for example.

In FIG. 2, a photographic lens 12 is installed in camera 11 and a film 15 is located, via a mirror 13 and an auxiliary mirror 14, along the optical axis of photographic lens 12. In FIG. 2, "A" designates a subject to be photographed or imaged.

A photoelectric conversion element 16 such as a line CCD or the like, is located in a position which is illuminated by light reflected by the auxiliary mirror 14. The output terminal of the photoelectric conversion element 16 is connected to a microprocessor 17 (hereinafter a "microcomputer"). It should be understood that while the term microcomputer is used herein for purposes of illustration, the embodiments of the present invention are not so limited and it goes without saying that embodiments of the present invention may use other control devices such as dedicated circuits and the like to carry out the functions of microprocessor 17. Also, it should be understood that a microcomputer will necessarily include such structures as a random access memory unit or RAM, a read-only memory unit or ROM (e.g., a non-volatile memory unit) and a central processing unit (CPU).

A half depression switch 17a, coupled to a release button which is not shown in the drawing, is connected to microcomputer 17. A drive circuit 18 is connected to output terminals PW1 and PW2 of the microcomputer 17.

A motor "M" 19 is connected to drive circuit 18. The rotation of motor 19 is converted, via a mechanical conversion unit 20, into back and forth displacement of photographic lens 12 to effectuate autofocusing (i.e., automatic lens movement along an optical axis thereof to bring about a particular focus state).

A rotation detection unit 21 counts the number of rotations of motor 19, and its output terminal is connected to the input terminal CN1 of the microcomputer 17.

Figure 3:
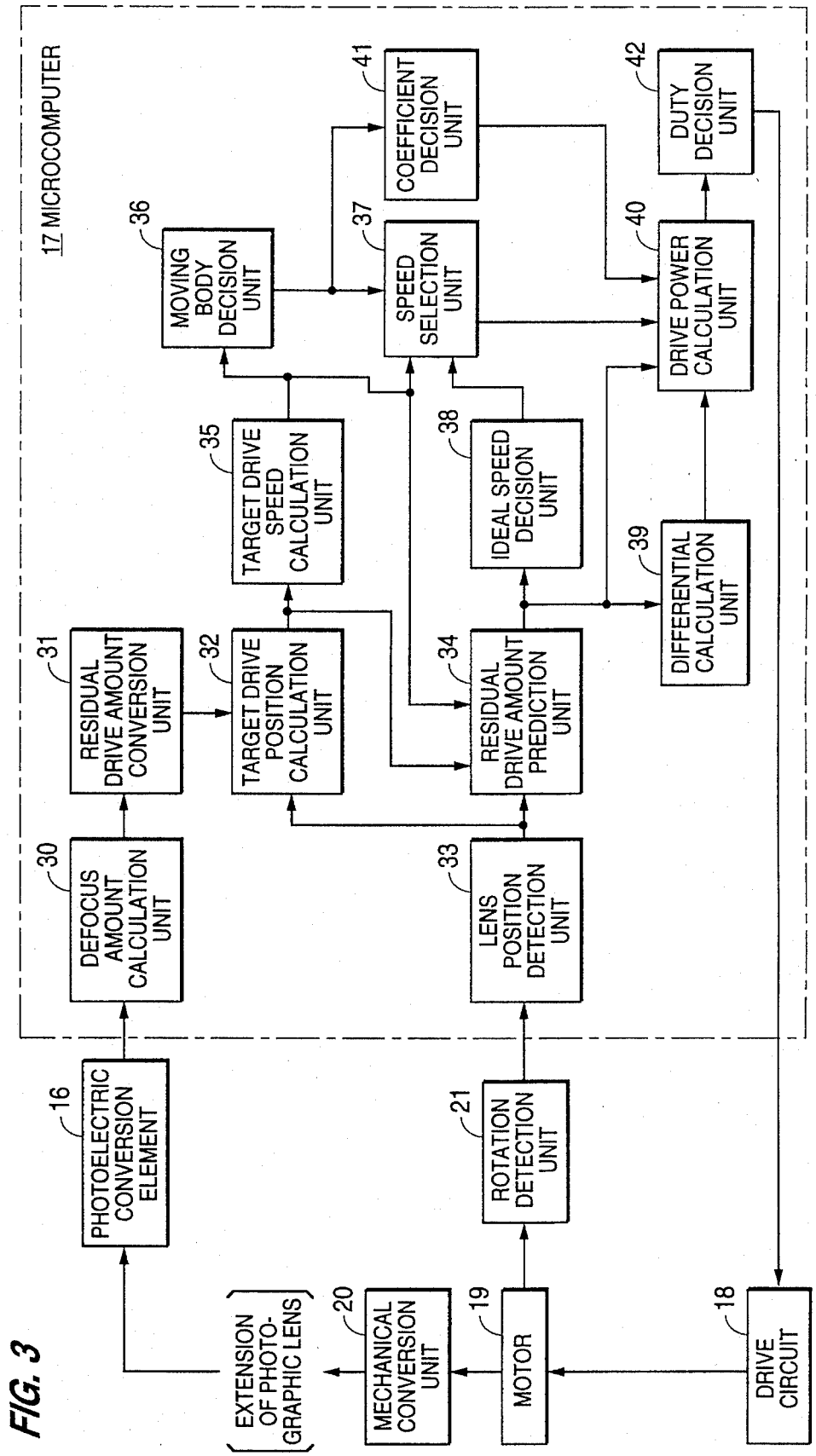
FIG. 3 is a block diagram of the processing units of the preferred embodiment of the automatic focus adjustment device of FIG. 2.

Referring now to FIG. 3, a block diagram shows a configuration of the processing units of the automatic focus adjustment device of the presently preferred embodiment of the present invention. In FIG. 3, the output of the photoelectric conversion element 16 is supplied to defocus amount calculation unit 30, and the output of the defocus amount calculation unit 30, via a residual drive amount conversion unit 31, is supplied to a first input of a target drive position calculation unit 32.

On the other hand, the output of the rotation detection unit 21 is supplied to a lens position detection unit 33. The output of the lens position detection unit 33 is supplied to a second input of the target drive position calculation unit 32 and to a first input of a residual drive amount prediction unit 34.

The output of the target drive position calculation unit 32 is supplied to a second input of the residual drive amount prediction unit 34 and to a target drive speed calculation unit 35. The output of the target drive speed calculation unit 35 is supplied to a third input of the residual drive prediction unit 34, to a movement decision unit 36 and to a first input of a speed selection unit 37.

The output of the residual drive amount prediction unit 34 is supplied to an ideal speed decision unit 38, a differential calculation unit 39 and to the first input of a drive power calculation unit 40. The output of the ideal speed decision unit 38 is supplied to a second input of the speed selection unit 37.

The output of the movement decision unit 36 is supplied to the control input of the speed selection unit 37 and to a coefficient decision unit 41. The output of the speed selection unit 37 is supplied to a second input of the drive power calculation unit 40.

The output of the differential calculation unit 39 is supplied to a third input of the drive power calculation unit 40. The output of the coefficient decision unit 41 is supplied, via a duty decision unit 42, to the drive circuit 18.

Moreover, in FIG. 3, where the same reference numerals are applied to features which are the same as those shown in FIG. 2, their description is omitted.

For purposes of brevity, the corresponding relationships of FIGS. 1 and 3 is now provided.

The drive circuit 18, motor 19 and mechanical conversion unit 20 correspond to the drive unit. The rotation detection unit 21 and the lens position detection unit 33 correspond to the lens position detection unit. The photoelectric conversion element 16, the defocus amount calculation unit 30, the residual drive amount conversion unit 31 and the residual drive amount prediction unit 34 correspond to the position deviation detection unit. The differential calculation unit 39 corresponds to the speed deviation calculation unit.

Furthermore, the target drive position calculation unit 32 and the target drive speed calculation unit 35 correspond to the target drive speed calculation unit, and the ideal speed setting unit 38 corresponds to the ideal speed setting unit. The movement decision unit 36 corresponds to the movement decision unit. The speed selection unit 37 corresponds to the speed selection unit, and the drive power calculation unit 40 and the duty decision unit 42 correspond to the calculation unit.

Figure 4:
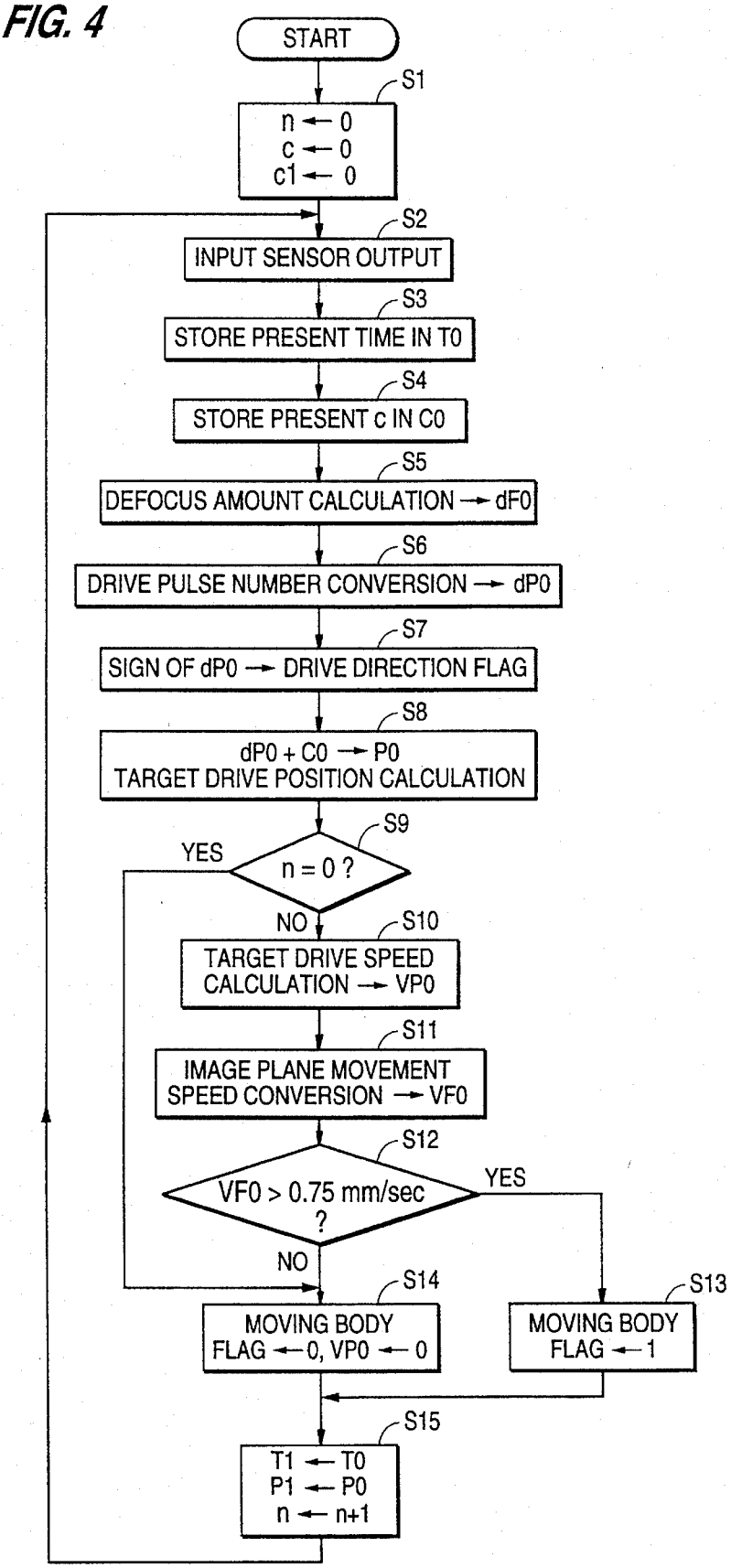
FIG. 4 is a flow chart of the operation of the preferred embodiment of the present invention.
Figure 5:
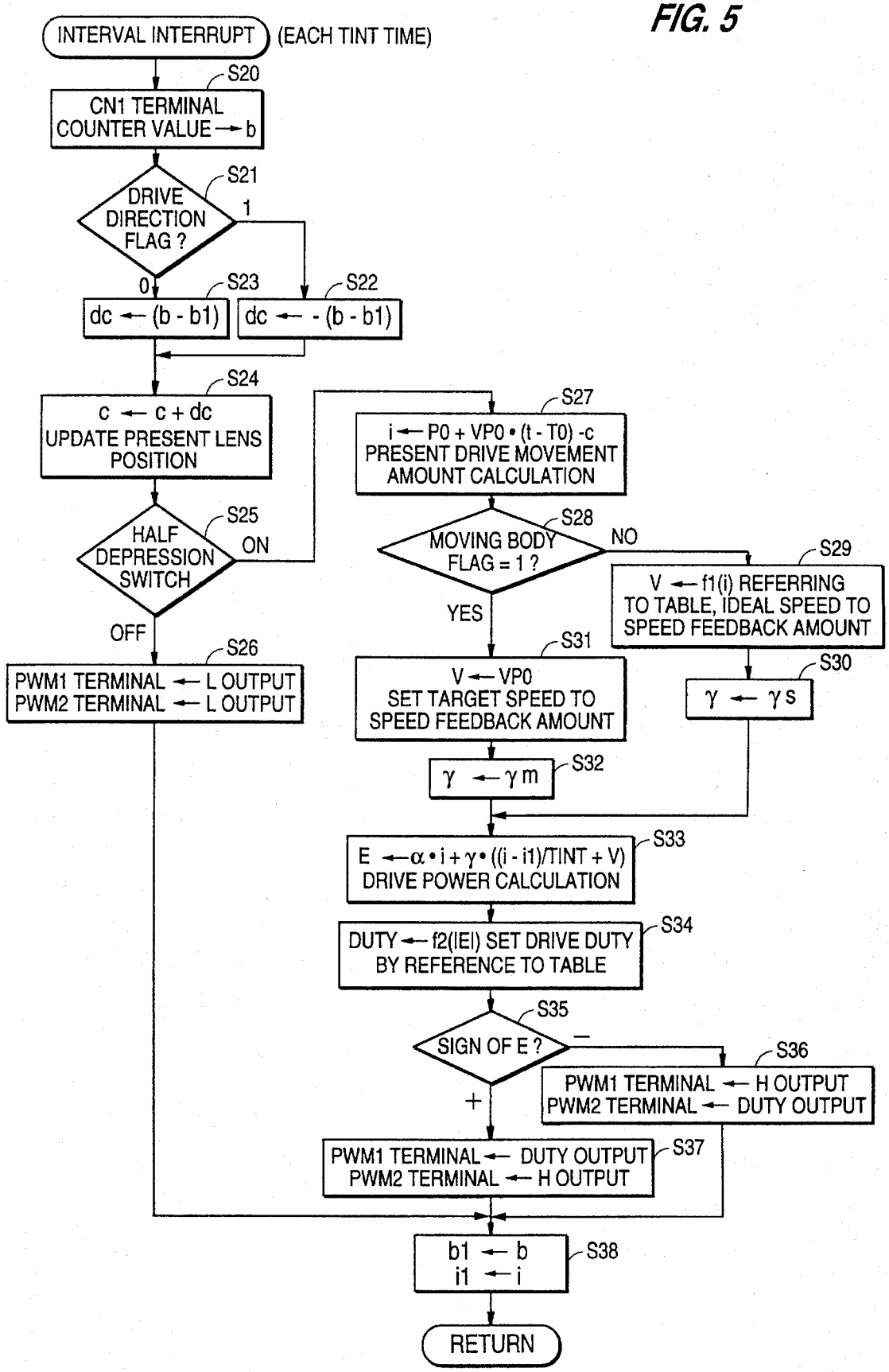
FIG. 5 is a flow chart of the interrupt process of the preferred embodiment of the present invention.

Referring now to FIGS. 4 and 5, the flow charts illustrated therein show the operations of the presently preferred embodiment of the present invention. A particular function and/or operation of the presently preferred embodiment of the present invention is explained with an appropriate reference to a flow chart entry by a parenthetical comment such as "(step S1)." Additionally, it should be understood that the operations illustrated in FIGS. 4 and 5 are carried out by microcomputer 17 and may be implemented by computer software programs.

With reference to FIG. 4, when a power supply is provided to microcomputer 17, the counter n and lens position c are initialized (step S1). Thereafter, the picture signal from the photoelectric conversion element 16 is input (step S2) and the present time is stored as time T0 (step S3). Furthermore, the value of the lens position c at time T0 is stored in the variable C0 (step S4).

Calculating according to the well known phase difference method, the defocus amount dF0, which is the focus displacement amount of the subject image and the imaging plane, is calculated from the picture signal which is input to microcomputer 17 (step S5).

The defocus amount dF0, using the characteristic conversion coefficient according to photographic lens 12, is converted into the value dP0 represented by the pulse number which the rotation detection unit 21 outputs (step S6). The positive or negative sign of the defocus amount dF0 is set as the drive direction in the sign bit of the value dP0 (step S7).

Next, the value dP0 is added to the initially stored variable C0, and the target drive position P0 to be reached by the photographic lens 12 in order to obtain a focused state is calculated (step S8).

When the defocus state is determined as indicated when n=0 (step S9), the target drive speed VP0 is calculated (step S10) using the target drive position P1 of a previous detection time and the time T1 of the previous time based on the following equation:

$$VP0=(P0-P1)/(T0-T1) \qquad \text{(Eq. 2)}$$

The target drive speed VP0 found in this manner, using the characteristic conversion coefficient which has been set according to the photographic lens 12, is converted into a subject image plane speed VF0 (mm/sec) which is represented by the distance on the optical axis of the photographic lens 12 (step S11).

The absolute value of the subject image plane speed VF0 is compared (greater or smaller) with a threshold 0.75 (mm/sec). If the subject image plane speed VF0 is large, a moving body flag is set (step S13). When the subject image plane speed is small, the value of the target drive speed VP0 is set to zero, and the moving body flag is reset (step S14).

In order for the process of a next time period to work properly, the present target drive position P0 and time T0 are substituted for the previous target drive position P1 and the time T1, and the counter n is incremented (step S15).

By repeatedly performing the above-described sequence of operations, the values of the target drive position P0 and the target drive speed VP0 are successively updated, and the moving body decision of the subject is performed.

The microcomputer 17 performs such processes, and in addition performs the interrupt process as follows during each single msec of operation.

Microcomputer 17 inputs the count value b of pulses output from the rotation detection unit 21 (step 20) (FIG. 5), and calculates (steps S22 and S23) the value dc with the added positive or negative sign of the drive direction flag by the difference of the count value b and the previous count value b1. By adding this value dc to the lens position c, the lens position c is updated to the present value (step S24).

If the half depression switch 17a has not been pressed (step S25), an actuation amount is not output to the drive circuit 18 (step S26) and the interrupt process ends to thereby perform later processes.

On the other hand, when the half depression switch 17a is pressed, the residual drive amount i of the present time t is calculated (step S27), based on the following equation:

$$i=P0+VP0\ (t-T0)-c \tag{Eq. 3}$$

The residual drive amount i calculated in this manner is the prediction value of the residual drive amount at the present time t.

Figure 6:
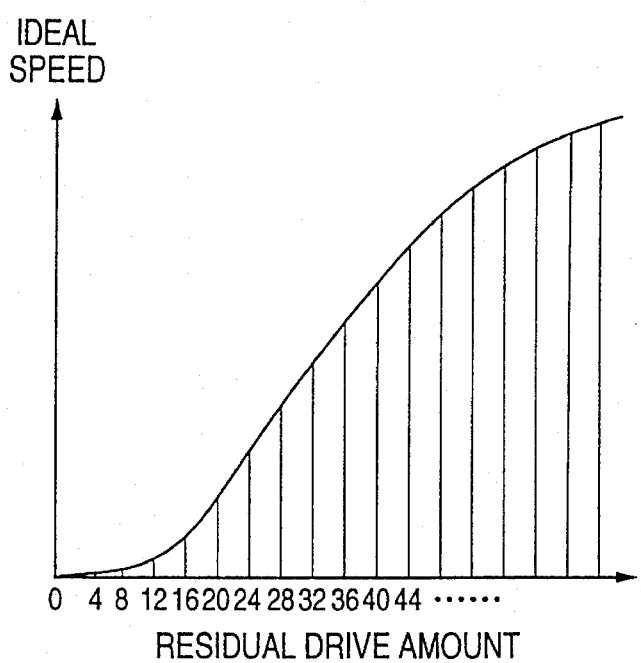
FIG. 6 is a graph that shows the operation of the preferred embodiment of the present invention when ideal operational speeds are realized.

When the subject is non-moving (step S28), referring to a table, the numerical values of which have been stored as shown in an example in FIG. 6, an ideal speed F1(i) is found, corresponding to the residual drive amount i. The ideal speed F1(i) is set in the speed feedback amount V (step S29).

This ideal speed F1(i) is a value which has already been set, to the degree the drive speed of the photographic lens 12 may be suitable, corresponding to the residual drive amount i.

Furthermore, with respect to a non-moving body, the feedback gain ys suitable for focus adjustment is set to the coefficient y (step S30).

On the other hand, when the subject is a moving body, the target drive speed VP0 is set at the speed feedback amount V, and the feedback gain suitable for focus adjustment with respect to the movement is set to the coefficient y (steps S31 and S32).

The actuation amount E (i.e., the amount to move the lens to bring about a particular focus state) is calculated (step S33), using the previous residual drive amount i1 and the interrupt process interval TINT, based on the following equation:

$$E=a \cdot i+y \cdot ((i-i1)/TINT+V) \tag{Eq. 4}$$

The drive duty value DUTY, which is provided to motor 19, is an effective current which corresponds to the absolute value of the drive power E calculated in this aforementioned manner and is set with reference to a table (step S34). This drive duty DUTY is inverted according to the sign of the drive power E (steps S36, S37) and is output to the drive circuit 18.

After execution of the aforementioned processes, in preparation for the next interrupt process, the residual drive amount i and the count value b are set as the previous residual drive amount i1 and count value b1 (step S38), and the interrupt process ends.

By way of such operations, in the automatic focus adjustment device of the presently preferred embodiment, when the subject is non-moving, the residual drive amount I, the time change amount of the residual drive amount i, and the ideal speed are fed back to the motor 19.

When the subject is non-moving, because the target drive position P0 is constant with respect to time, and also the target drive speed VP0 is zero, the time change of the residual drive amount i is equal to the drive speed of the photographic lens 12 with a negative sign.

Figure 7A:
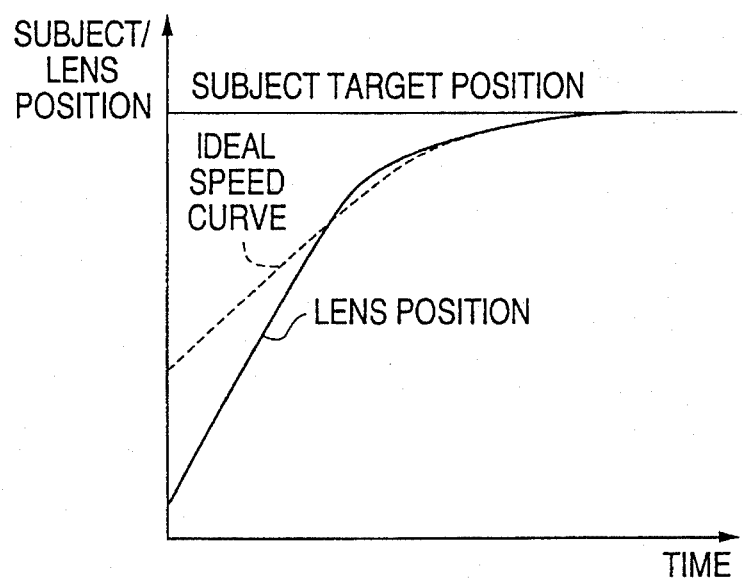
FIGS. 7(a) and 7(b) are graphs that illustrate the operation of the preferred embodiment of the present invention when a subject is a non-moving body.
Figure 7B:
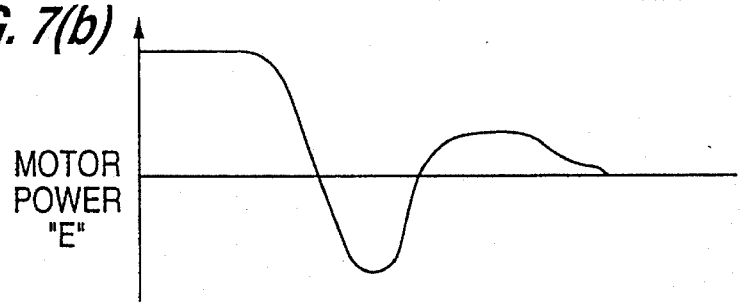

In this manner, the speed deviation, which is the difference of the ideal speed f1(i) and the drive speed of the photographic lens 12, is fed back together with the residual drive amount i to the motor 19, and as shown in FIGS. 7(a) and 7(b), the photographic lens 12 is rapidly driven at a drive speed following the ideal speed, and is focused at a position making the residual drive amount i zero. Accordingly, the response time required for focusing can be greatly shortened.

On the other hand, when the subject is non-moving, the residual drive amount i, the time change of the residual drive amount i, and the target drive speed VP0 are fed back to the motor 19. By means of this kind of feedback, the photographic lens 12, in a state which conforms to the locus of the target drive position, because an actuation amount proportional to the target drive speed VP0 is applied to the motor 19, the energy losses which occur in the motor 19 and the mechanical conversion unit 20 are compensated.

Accordingly, the drive speed of the photographic lens 12 is not reduced and the photographic lens 12 continues in a state which conforms to the locus of the target drive position.

Figure 8A:
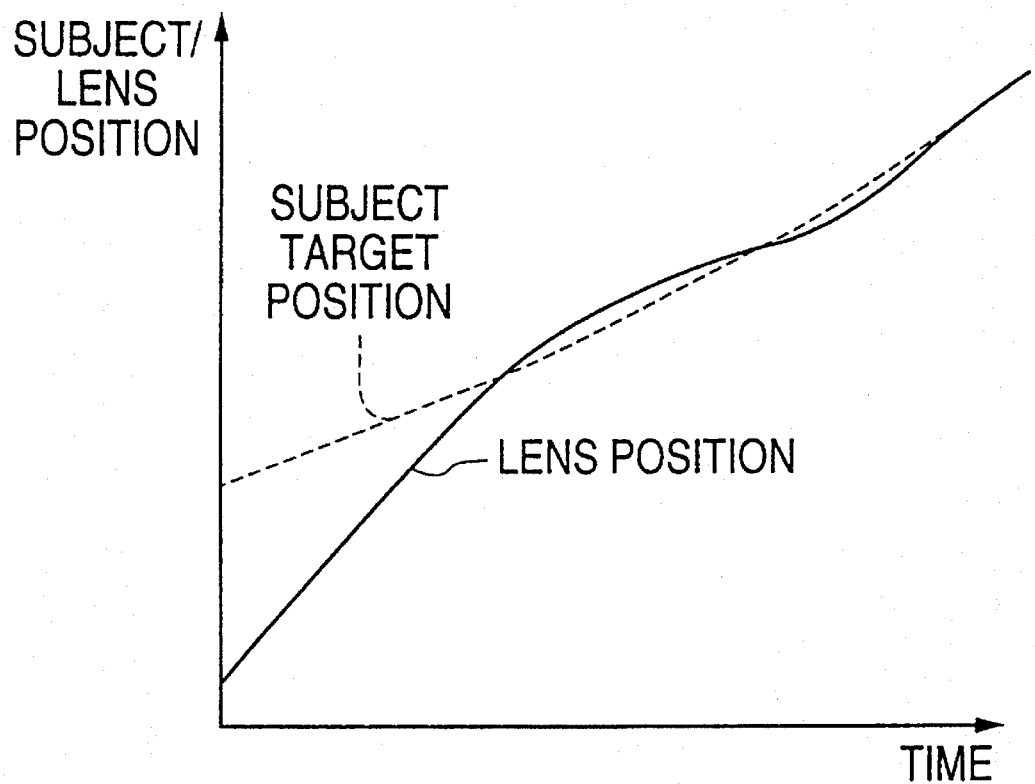
FIGS. 8(a) and 8(b) are graphs that illustrate the operation of the preferred embodiment of the present invention when a subject is a moving body.
Figure 8B:
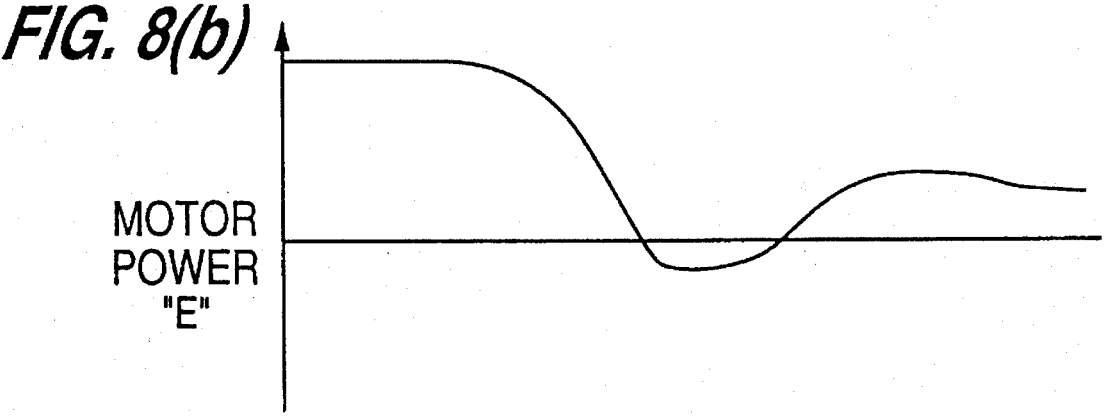

Accordingly, as shown in FIGS. 8(a) and 8(b), while the photographic lens 12 is driven smoothly, its focused state can be maintained with accuracy.

Moreover, in the automatic focus adjustment device of the presently preferred embodiment of the invention, because the feedback power E can be calculated, using Eq. 4 in common with respect to both non-moving and moving subjects, the calculation process, etc., can be made common and uniform for all subjects.

Moreover, because there is no integral term ($\beta \cdot \int i\ dt$) as in the prior art, there are no elements which waste time, and the stability of the control system can be markedly improved.

Accordingly, because the design margins of the feedback gains a and y are wide, good control characteristics can easily be obtained. Moreover, because there are no elements which waste time, focusing adjustments can be promptly performed in response to sudden movements of the subject. Furthermore, because the storage of the residual drive amounts i of a number of past periods, which was essential in the prior art in order to calculate the integral term ($\beta \cdot \int i\ dt$), is unnecessary, memory elements or other memory capacity can be saved.

Moreover, because it is not necessary to sequentially calculate the residual drive amount i of a number of past periods, the load on the calculation process can be lessened. Furthermore, in the automatic focus adjustment device of the presently preferred embodiment of the present invention, according to the decision as to whether the subject is moving, the time change amount of the residual drive amount and the coefficients of the speed feedback amounts can be changed accordingly. By changing the coefficient y to a feedback gain which obtains a suitable control characteristic, the response characteristic of the focusing adjustment can be optimized.

Moreover, in the presently preferred embodiment of the invention, the prediction value of the residual drive amount i is used as a position deviation, but there is no such limitation to the present invention. For example, shortening the time interval to detect the defocus amount dF0, and by providing for a speeding up of the processing time, not using a predicted value of the residual drive amount, the defocus amount dF0, or the defocus amount dF0 converted to a residual drive amount, can be used without further change as the position deviation value.

Moreover, using the target drive speed VP0 as shown in Eq. 3, the load of the linear predictive calculation when calculating the predicted value i of the residual drive amount is reduced. However, the present invention is not so limited. That is, the residual drive amount up to a present time can be converted from the defocus amount, and the lens position up to a present time and the predicted value i of the residual drive amount may be calculated by multiplying by suitable predictive coefficients and adding the same.

An example has been given of focusing adjustment by way of sample value control, but the present invention is not so limited, and continuous value control may be performed.

An example of ideal speed control is shown in FIG. 6. Any suitable speed may be set corresponding to the residual drive amount which is a position deviation. Moreover, the ideal speed increases monotonically according to the defocus amount dF0, and also, when the defocus amount dF0 is zero. The ideal speed is preferably set so that it also becomes zero, and by it setting it in this manner, driving the photographic lens 12 more smoothly becomes possible. Additionally, the photographic lens 12 can be caused to stop at the target drive position without overshooting.

Furthermore, in the presently preferred embodiment of the invention, the defocus amount is calculated by the phase difference method, and the position deviation is found by converting the defocus amount into the residual drive amount of the motor 19. However, the present invention is not so limited. For example, embodiments of the present invention may be configured using ultrasonic, optical, and the like range finding systems wherein the position deviation of the subject image and the imaging plane may be indirectly found by calculating the difference of the distance from the camera to the subject and the present photographic distance of the photographic lens 12.

Moreover, in the presently preferred embodiment of the invention, a calculation process by weighted addition is used in the calculation of the actuation amounts. However, the actuation amounts may be calculated by performing a calculation process by a fuzzy calculation process (i.e., fuzzy logic) and the like with respect to the position deviation and the speed deviation and the speed feedback amount.

Eq. 4 illustrates that the presently preferred embodiment of the present invention adds the time change amount of the residual drive amount and the speed feedback amount equally, but the present invention is not so limited and the same may be configured to regulate the proportional addition of such values.

Although a preferred embodiment of the present invention has been shown and described, it will be readily appreciated by those skilled in the art that many changes may be made in the preferred embodiment without departing from the principles and spirit of the invention, the scope of which is defined in the appended claims and equivalents thereof.

What is claimed is:

1. An automatic focus adjustment device for use with a camera having a photographic lens, the device comprising:

a drive unit changing an extension state of a photographic lens;

a lens position detection unit detecting the extension state of the photographic lens;

a position deviation detection unit detecting the position deviation between a position of a subject as imaged by the photographic lens and an imaging plane;

a speed deviation calculation unit inputting the position deviation detected by the position deviation detection unit and calculating the speed deviation due to a time change of the detected position deviation;

a target drive speed calculation unit which, based on the extension state of the photographic lens as detected by the lens position detection unit and on the position deviation detected by the position deviation detection unit, calculates a target drive position for the photographic lens and calculates a target drive speed based on the time change of the target drive position;

an ideal speed decision unit which, based on the position deviation detected by the position deviation detection unit, determines a previously set ideal speed for moving the photographic lens;

a movement decision unit determining whether the subject is a moving body;

a speed selection unit selecting the target drive speed when it has been determined by the movement decision unit that the subject is a moving body and selecting the ideal speed when it has been determined by the movement decision unit that the subject is a non-moving body; and a calculation unit calculating the actuation amount to be output by the drive unit based on the position deviation detected by the position deviation detection unit, the speed deviation calculated by the speed deviation calculation unit and the speed selected by the speed selection unit.

2. The device of claim 1, wherein the position deviation detection unit further comprises:

a defocus amount detection unit which, in a predetermined time interval, detects a defocus amount of the photographic lens, the defocus amount of the photographic lens being the amount of displacement of the photographic lens from a focused state;

a residual drive amount conversion unit converting the defocus amount of the photographic lens into a residual drive amount to be used by the drive unit; and a residual drive amount prediction unit performing linear prediction based on the residual drive amount converted by the residual drive amount conversion unit and on the extension state of the photographic lens detected by the lens position detection unit by calculating a predicted value of the residual drive amount at a previously established point in time and outputting the residual drive amount as the position deviation.

3. The device of claim 1, wherein the position deviation detection unit further comprises:

a defocus amount detection unit which, in a predetermined time interval, detects a defocus amount of the photographic lens, the defocus amount of the photographic lens are the amount of displacement of the photographic lens from a focused state;

a residual drive amount conversion unit converting the defocus amount of the photographic lens into a residual drive amount to be used by the drive unit; and a residual drive amount prediction unit performing linear prediction based on the residual drive amount converted by the residual drive amount conversion unit and on the extension state of the photographic lens detected by the lens position detection unit by calculating a predicted value of the residual drive amount at a previously established point in time and outputting the predicted value of the residual drive amount as the position deviation.

4. The device of claim 1, wherein the movement decision unit determines whether the subject is a moving body based on the value of the target drive speed calculated by the target drive speed calculation unit.

5. The device of claim 2, wherein the movement decision unit determines whether the subject is a moving body based on the value of the target drive speed calculated by the target drive speed calculation unit.

6. The device of claim 3, wherein the movement decision unit determines whether the subject is a moving body based on the value of the target drive speed calculated by the target drive speed calculation unit.

7. The device of claim 1, wherein the calculation unit calculates the actuation amount by weighted addition of the speeds which have been determined by the position deviation detection unit, the speed deviation unit, and the speed selection unit.

8. The device of claim 2, wherein the calculation unit calculates the actuation amount by weighted addition of the speeds which have been determined by the position deviation detection unit, the speed deviation unit, and the speed selection unit.

9. The device of claim 3, wherein the calculation unit calculates the actuation amount by weighted addition of the speeds which have been determined by the position deviation detection unit, the speed deviation unit, and the speed selection unit.

10. The device of claim 7, wherein the calculation unit further comprises an adaptive control unit which changes the weighting of the speeds selected by the speed deviation detection unit and the speed selection unit based on the determination of the movement decision unit as to whether the subject is a moving body.

11. The device of claim 8, wherein the calculation unit further comprises an adaptive control unit which changes the weighting of the speeds selected by the speed deviation detection unit and the speed selection unit based on the determination of the movement decision unit as to whether the subject is a moving body.

12. The device of claim 9, wherein the calculation unit further comprises an adaptive control unit which changes the weighting of the speeds selected by the speed deviation detection unit and the speed selection unit based on the determination of the movement decision unit as to whether the subject is a moving body.

13. An automatic focus adjustment device for use with a camera having a photographic lens, the device comprising:

a drive unit changing an extension state of a photographic lens;

a lens position detection unit detecting the extension state of the photographic lens;

a position and speed deviation detection unit detecting the position deviation between a position of a subject as imaged by the photographic lens and an imaging plane, and calculating the speed deviation due to a time change of the detected position deviation;

a target drive speed calculation unit which, based on the extension state of the photographic lens as detected by the lens position detection unit and on the position deviation detected by the position deviation detection unit, calculates a target drive position for the photographic lens and calculates a target drive speed based on the time change of the target drive position;

an ideal speed decision unit which, based on the position deviation detected by the position deviation detection unit, determines a previously set ideal speed for moving the photographic lens;

a movement decision unit determining whether the subject is a moving body;

a calculating unit selecting the target drive speed when it has been determined by the movement decision unit that the subject is a moving body and selecting the ideal speed when it has been determined by the movement decision unit that the subject is a non-moving body, and calculating the actuation amount to be output by the drive unit based on the position deviation, the speed deviation and the speed.

\* \* \* \* \*